United States Patent
Misumi (10) Patent No.: US 6,829,337 B2
(45) Date of Patent: Dec. 7, 2004

(54) TELEPHONE APPARATUS WITH CAPABILITY OF ADDING, DELETING AND COMPARING TELEPHONE NUMBERS

(75) Inventor: Shuichi Misumi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/379,793

(22) Filed: Mar. 6, 2003

(65) Prior Publication Data

US 2003/0169861 A1 Sep. 11, 2003

(30) Foreign Application Priority Data

Mar. 6, 2002 (JP) ........................................ 2002-059930

(51) Int. Cl.[7] .......................... H04M 11/00; H04M 1/27
(52) U.S. Cl. .............................. 379/93.23; 379/142.04; 379/142.06; 379/354; 379/355.06; 455/564
(58) Field of Search ........................ 379/93.23, 93.17, 379/93.18, 100.14, 142.01, 142.04, 142.06, 88.19–88.21, 354, 355.01, 355.02, 355.05–355.1; 455/564, 460, 415, 414.1

(56) References Cited

U.S. PATENT DOCUMENTS

| 5,422,938 | A | | 6/1995 | Yamanishi |
| 5,528,680 | A | | 6/1996 | Karpicke |
| 5,894,507 | A | * | 4/1999 | Hatamura ................. 379/93.23 |
| 5,963,876 | A | | 10/1999 | Manssen et al. |
| 6,067,349 | A | * | 5/2000 | Suder et al. ............. 379/88.19 |
| 6,222,917 | B1 | * | 4/2001 | Gates ..................... 379/218.01 |
| 6,289,226 | B1 | | 9/2001 | Lekven et al. |
| 6,449,475 | B1 | * | 9/2002 | Chinnaswami .............. 455/415 |
| 6,639,979 | B1 | * | 10/2003 | Kim ...................... 379/142.06 |

FOREIGN PATENT DOCUMENTS

| JP | 4-360445 | 12/1992 |
| JP | 11-74961 | 3/1999 |

* cited by examiner

Primary Examiner—Wing Fu Chan
(74) Attorney, Agent, or Firm—McDermott Will & Emery LLP (57) ABSTRACT

A telephone apparatus of the present invention comprises a telephone number comparator for comparing a telephone number included in caller information delivered from caller identification delivery service with a telephone number registered in an electronic telephone directory, and displays the telephone number registered in the electronic telephone directory in display unit when the telephone numbers match at least in part as a result of the comparison. The telephone apparatus is thus able to display a correct telephone number of the incoming call and dial the telephone number correctly when making a callback.

7 Claims, 6 Drawing Sheets

TELEPHONE APPARATUS WITH CAPABILITY OF ADDING, DELETING AND COMPARING TELEPHONE NUMBERS

FIELD OF THE INVENTION

The present invention relates to a telephone apparatus with a capability of making addition and deletion of area code easily when making a callback to a telephone number of an incoming call.

BACKGROUND OF THE INVENTION

Telephone apparatuses adapted to caller identification delivery services hitherto have functions of storing received information of a calling party and displaying a telephone number of the calling party in a display unit.

Figure 7:
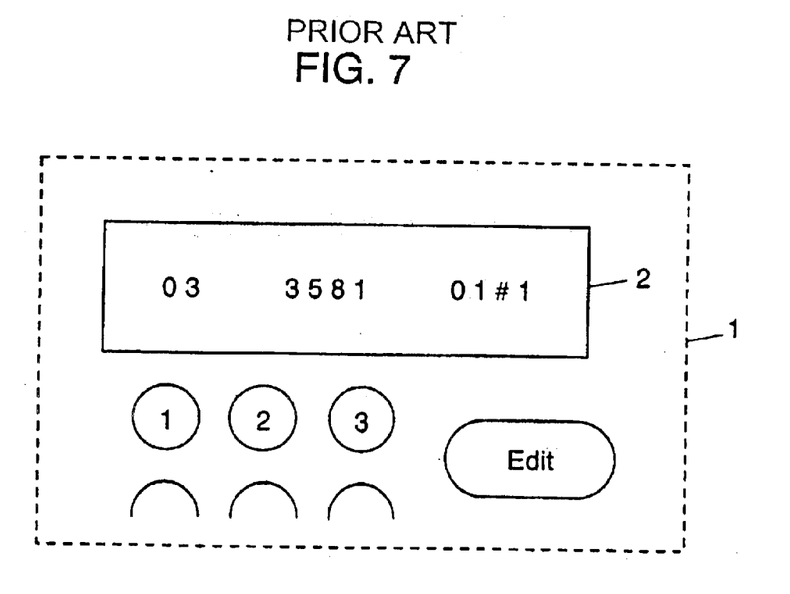
FIG. 7 is a schematic illustration showing a telephone number displayed in a display unit of a telephone apparatus of the prior art.

FIG. 7 through FIG. 10 are schematic illustrations, each showing a telephone number displayed in a display unit of a telephone apparatus of the prior art: As shown in FIG. 7, telephone apparatus 1 of the prior art adapted to the caller identification delivery services has functions of storing received information of a calling party and displaying a telephone number of the calling party in display unit 2. When a user at the call-receiving side wishes to return the call, or call back the telephone number shown in display unit 2 of the telephone apparatus 1, the user normally performs a simple call operation (off-hook operation) without dialing the number to make the call.

Figure 8:
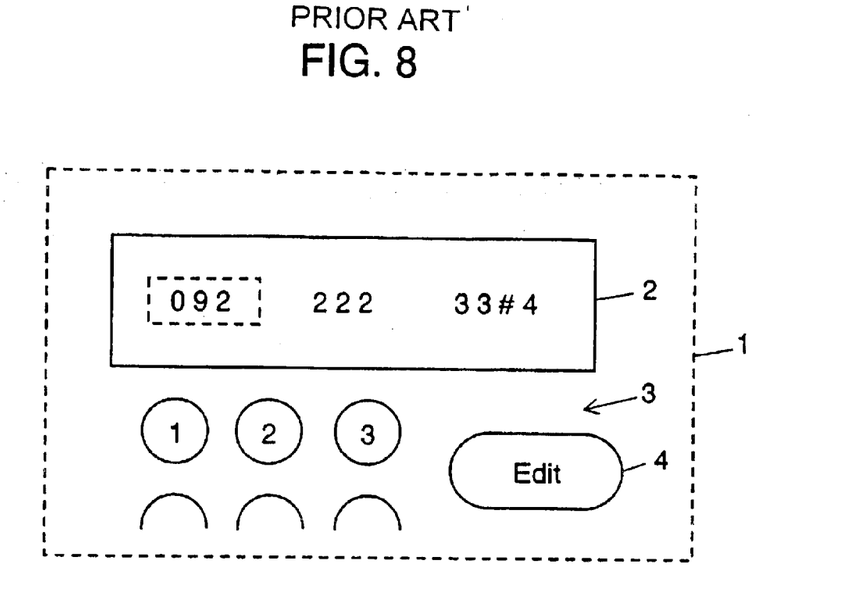
FIG. 8 is a schematic illustration showing another telephone number displayed in the display unit of the telephone apparatus of the prior art.

However, as shown in FIG. 8, the telephone apparatus 1 heretofore displays even an area code, which needs not be displayed, if both of the calling party and the call-receiving party are within the same area (area code of "092" for instance). Although the user at the call-receiving side can make a callback (a return telephone to the caller) by simply performing an off-hook operation, it takes time to call back because the telephone apparatus dials even the area code, which is not really necessary.

In addition, it costs an extra charge when the area code "092" is dialed in some cases, depending on telephone companies.

Since the area code is not necessary when calling a party in the same area as the caller, it is desirable to delete the area code "092" as marked in a square enclosure of dotted line in the case shown in FIG. 8, for example. In this case, while the caller's telephone number delivered by the caller identification delivery services being shown in display unit 2, the user first switches into an editing mode by pressing edit button 4 on control section 3, and moves a cursor to a digit to be deleted by operating a cursor button. The user then deletes the digit highlighted by the curser one after another to erase the unnecessary area code "092", and completes revision of the telephone number.

Figure 9:
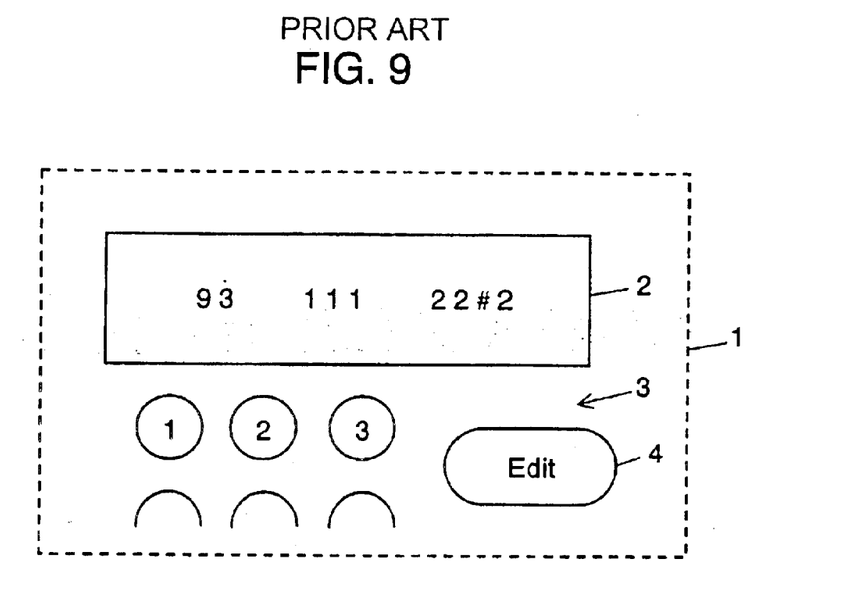
FIG. 9 is a schematic illustration showing still another telephone number displayed in the display unit of the telephone apparatus of the prior art.
Figure 10:
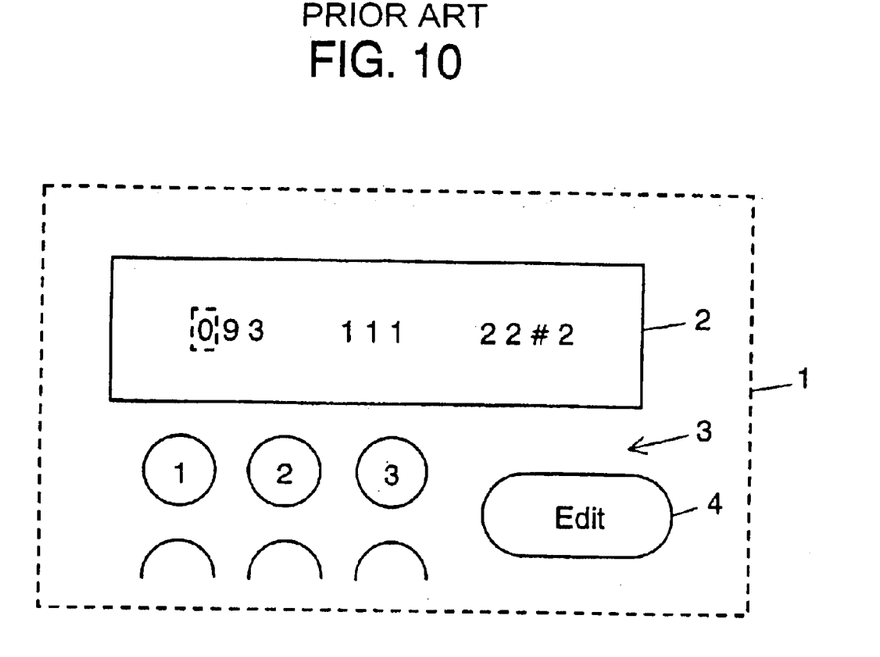
FIG. 10 is a schematic illustration showing yet another telephone number displayed in the display unit of the telephone apparatus of the prior art.

In some cases, depending on services of telephone companies, all digits of the area code are not completely delivered through the telephone line, as shown in FIG. 9, even if a calling party and a call-receiving party are in different areas from each other. If this is the case, it is likely that display unit 2 does not show all digits of the area code of the calling party, but only digits "93" out of the area code "093". When this happens, the user needs to properly addresses the area code "093" before making a callback. For this, the user turns the editing mode first by pressing edit button 4 on control section 3, and operates the cursor button to move the cursor to a position of digit where a new digit is inserted, as shown in FIG. 10.

Then, the user operates a ten-key button on the control section 3 to input a digit to be added one by one, to make a revision of the telephone number, i.e. adds a digit "0" of the area code "093" as marked by a square of dotted-line.

As described, there are cases in that the user needs to revise telephone numbers according to area codes in the telephone numbers of incoming calls, when the user wants to call back the other parties of the incoming calls. It has been a very annoying task for the user to revise telephone numbers in the above manner. In addition, since the telephone apparatus displays a telephone number of any incoming call just as it is delivered, it is quite unclear for the user if the area code is not displayed completely. Moreover, a problem has been that the user can not use the telephone number as is for dialing a call, if he/she registers the number just as it is received into an electronic telephone directory.

In U.S. Pat. No. 5,422,938, there is disclosed a telephone apparatus that stores telephone numbers transmitted from a telephone exchange, and edits the stored telephone number data for use in making a callback. That is, whenever the telephone apparatus detects a telephone number of a calling party incoming from a telephone line, it stores the number in a memory. An editing unit reads telephone numbers out of the memory by switching them one after another in a sequential order according to a command from an input unit, and displays them in a display unit. The telephone apparatus transmits a telephone number edited by the editing unit to the telephone line when the user makes a call operation.

Japanese Patent Unexamined Publication, No. H04-360445 has also been published as a corresponding patent to the above.

Furthermore, Japanese Patent Unexamined Publication, No. H11-74961 discloses another telephone apparatus that allows a user to register a short dial number easily and accurately without requiring a user to input identification information of a calling party such as telephone number and name. That is, the telephone apparatus stores in a memory caller's telephone numbers received through a receiving unit. When the user selects one of the caller's telephone numbers stored in the memory while showing them in a display unit, the apparatus retrieves information of a caller corresponding to the selected caller's telephone number from a telephone directory database stored in a storage medium such as CD-ROM, and displays it in the display unit. When the user operates a key on a control section for registration of short dial number, the apparatus registers in the memory any of the selected caller's telephone number and the telephone number retrieved from the telephone directory database, along with identification information such as caller's name in a corresponding manner to the short dial number.

SUMMARY OF THE INVENTION

According to the present invention, a telephone apparatus comprises: a) a caller information receiving unit for receiving caller information delivered from caller identification delivery services along with rings of an incoming call; b) a caller information storage unit for storing the received caller information; c) a display unit for displaying the received caller information; d) a dial signal transmitter for transmitting a dial signal; e) an electronic telephone directory for registering a telephone number and the like; and f) a telephone number comparator for comparing a telephone number included in the caller information stored in the caller information storage unit with another telephone number registered in the electronic telephone directory, wherein the display unit displays a telephone number based on the telephone number registered in the electronic telephone directory when the telephone numbers match at least in part as a result of comparison by the telephone number comparator.

DESCRIPTION OF THE PREFERRED EMBODIMENT

With reference to FIG. 1 through FIG. 6, an exemplary embodiment of the present invention is described hereinafter. Although this invention can be embodied in any type of telephone apparatuses, either cordless or not cordless, and a type equipped with a facsimile function, the description below is provided of a cordless-type telephone apparatus as an example, and it also represents other types of telephone apparatuses.

Figure 1:
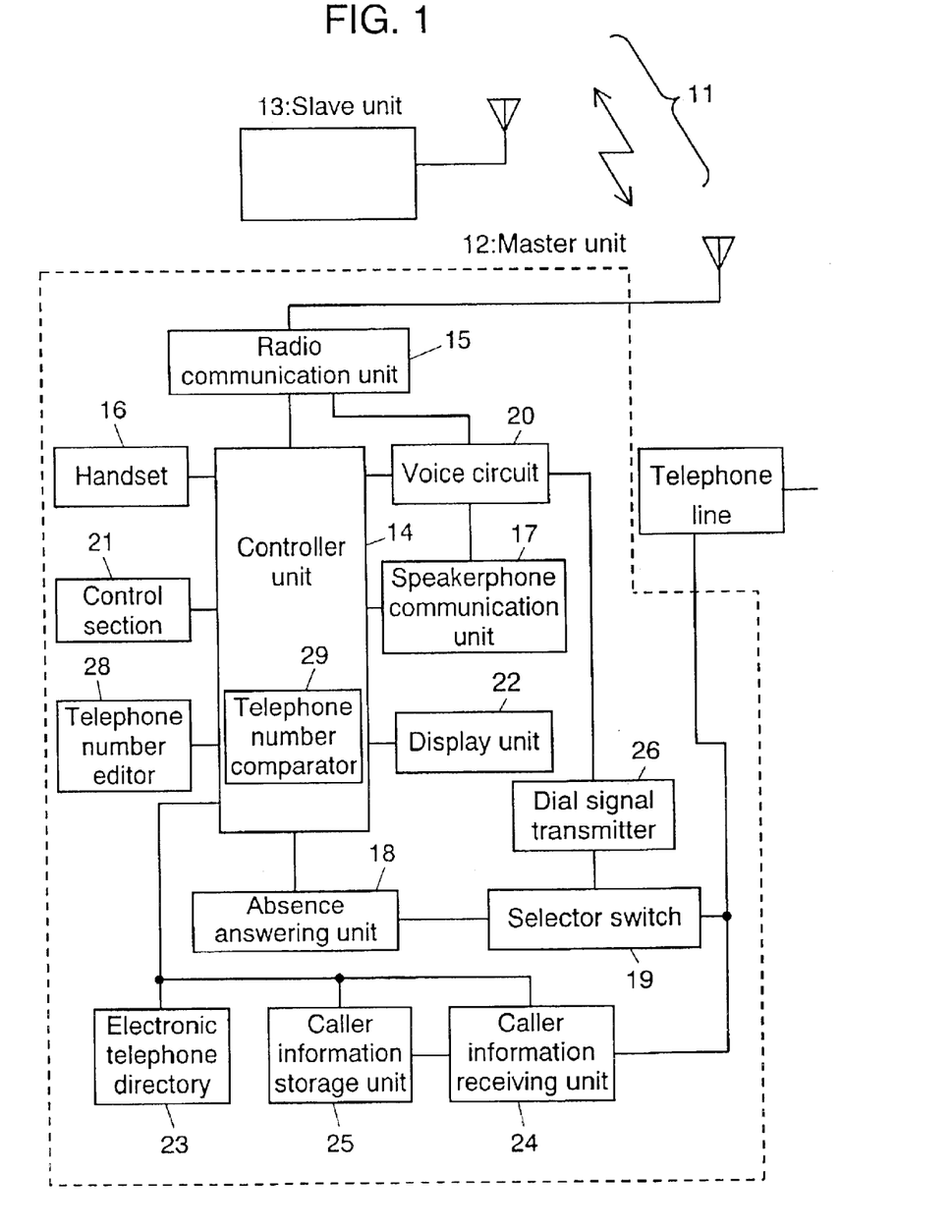
FIG. 1 is a block diagram showing a structure of a telephone apparatus according to an exemplary embodiment of the present invention.

FIG. 1 is a block diagram showing a structure of the telephone apparatus according to this exemplary embodiment, and FIG. 2 through FIG. 6 are schematic illustrations showing telephone numbers displayed in a display unit of the telephone apparatus according to this exemplary embodiment. In FIG. 1, telephone apparatus 11 comprises master unit 12 connected to a telephone line, and at least one slave unit 13. Master unit 12 and slave unit 13 are capable of making interactive radio communications within a certain distance (100 to 150 meters) therebetween.

Master unit 12, under the control of controller unit 14, transmits and receives audio signals to and from another party on telephone, and makes an interactive radio communication at the same time with the slave unit 13 through radio communication unit 15 having a radio transmitter and a radio receiver. Controller unit 14 comprises CPU, RAM, ROM and the like, and carries out overall control of master unit 12. Because master unit 12 includes handset 16 connected thereto with a cord, a user can pick up the handset 16 off a hook to make a radio communication with slave unit 13 (internal call), or a telephone call with an outside party through the telephone line (outside call).

Also, since master unit 12 is provided with speakerphone communication unit 17, the user can talk to the telephone hands-free by pressing a switch of speakerphone communication unit 17.

Because master unit 12 is provided with answering unit 18, it actuates answering unit 18 to record an incoming message if a handset is not taken off hook of master unit 12 or slave unit 13 even when a ring is delivered from the telephone line. Controller unit 14 is so designed that, in such a case, it turns selector switch 19 from voice circuit 20 to answering unit 18 when the handset is not taken off the hook after the bell rings a given number of times (six times for example). When the user makes a phone call, he/she can display and confirm a telephone number he/she wishes to dial in display unit 22, as he/she dials by operating control section 21. Or, if the party to whom he/she makes a call has already been registered in electronic telephone directory 23, he/she can retrieve the telephone number from electronic telephone directory 23 by referring to a name of the party, display it in display unit 22, and executes an off-hook operation thereafter to make the call.

When an incoming call arrives, the caller identification delivery service transmits caller information between the first and the second rings. This activates the controller unit 14, and caller information receiving unit 24 receives and immediately stores the caller information into caller information storage unit 25. Controller unit 14 reads the caller information stored in caller information storage unit 25, and displays it in display unit 22 comprised of an LCD (liquid crystal display) or the like.

Specifications of the caller information are different between the United States and Japan at the time of this invention, as they contain telephone number and name in the North American region including the United States, whereas they contain only telephone number in Japan. In this exemplary embodiment, the following description is provided to cover the caller information according to the specifications available in Japan, which contain only telephone number, in order to simplify the description. However, this invention can be embodied with caller information of any of the specifications for both the United States and Japan.

Figure 2:
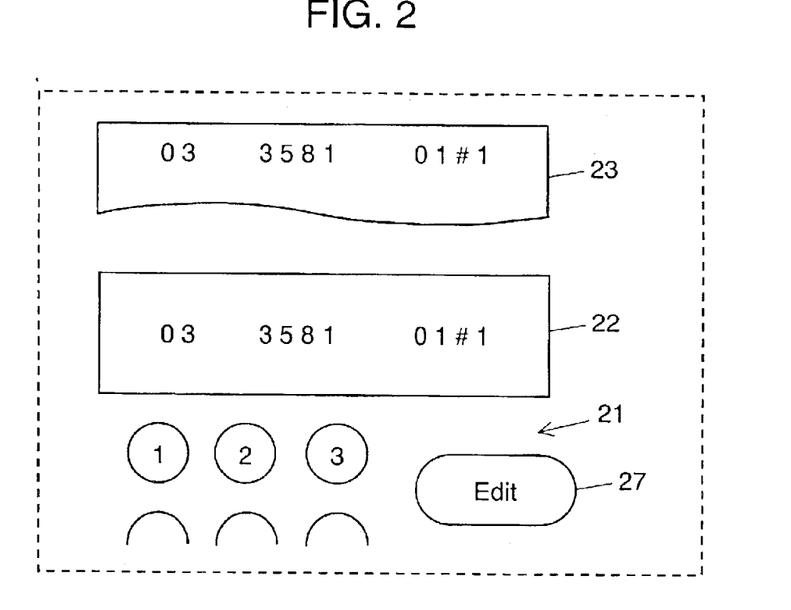
FIG. 2 is a schematic illustration showing a telephone number displayed in a display unit of the telephone apparatus according to the same exemplary embodiment of the invention.

An example shown in FIG. 2 represents a case in which a call-receiving party and a calling party are in different areas. As shown in FIG. 2, display unit 22 in master unit 12 shows a telephone number "03 3581 01#1" (for Japanese specification) which represents caller information delivered to it, wherein an area code of this number is different from that of the call-receiving party.

When a user of the call-receiving party intends to call back the telephone number shown in display unit 22 of master unit 12 of telephone apparatus 11, he/she can make the call to the party in display unit 22 by simply pressing a callback button (not show in the figure) located in control section 21, as a call operation without dialing.

When the user presses the callback button, controller unit 14 reads the received telephone number stored in caller information storage unit 25, and activates dial signal transmitter 26 to dial the number. When dial signal transmitter 26 starts dialing, selector switch 19 is switched to side of voice circuit 20.

Figure 3:
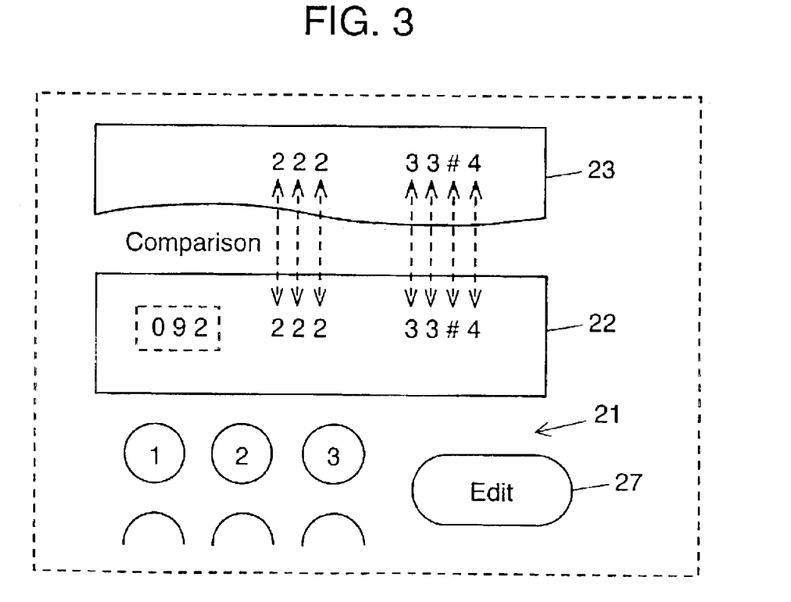
FIG. 3 is a schematic illustration showing another telephone number displayed in the display unit of the telephone apparatus according to the same exemplary embodiment of the invention.

Another example shown in FIG. 3 represents a case in which a call-receiving party and a calling party are in the same area. Suppose now that display unit 22 shows a received telephone number "092 222 33#4, for instance as shown in FIG. 3. The area code of this telephone number is the same as that of the call-receiving party, and it therefore includes the area code which actually needs not be displayed. Although the user at the call-receiving side can make a callback in most cases by simply pressing a callback button, it takes time as stated previously, and may cost an extra charge in some cases, depending on telephone companies.

However, this gives rise to a problem in some cases, in that it takes time to make the callback because it dials the area code, which is not really necessary when making a call within the same area, and it costs an extra charge as compared to the ordinary callback dialing depending on telephone companies, as stated above. For the above reason, the user needs to make the call after deleting the area code "092" marked in a square enclosure of dotted line from the telephone number being displayed in display unit 22.

To delete the area code "092", the user presses edit button 27 on control section 21, and the telephone apparatus switches into an editing mode which activates telephone number editor 28 for editing the telephone number displayed in display unit 22 according to a telephone number registered in electronic telephone directory 23.

First, telephone number comparator 29 compares the telephone number "092 222 33#4" displayed in display unit 22 with another telephone number among those telephone numbers and the like (normally included are the telephone numbers and names) previously registered in the electronic telephone directory 23. Actually, telephone number comparator 29 compares the telephone numbers registered in electronic telephone directory 23 and the received telephone number stored in caller information storage unit 25. In this process, the telephone number shown in display unit 22 and the received telephone number stored in caller information storage unit 25 are identical since controller unit 14 reads and displays in display unit 22 the telephone number it has received and stored in caller information storage unit 25.

A comparing method is such that telephone number comparator 29 checks individual digits of the telephone numbers one by one from the last place to a predetermined place in a sequential order, to determine if they match. For example, when there is a seven-digit telephone number without an area code such as "222 33#4", as shown in FIG. 3, among those registered in electronic telephone directory 23, telephone number comparator 29 checks each digit from the last place up to the seventh place. The above process is carried out according to the steps described in detail below.

(1) First, one number is read out among a plurality of numbers registered in electronic telephone directory 23 according to a predetermined order. (In the following steps, a telephone number read out first from electronic telephone directory 23 is referred to as a first telephone number, and another telephone number read out second is referred to as a second telephone number.)

(2) Between the telephone number read out from electronic telephone directory 23 and the telephone number displayed in display unit 22, one that has a fewer number of digits is defined as a reference number.

(3) A judgment is made as to whether a digit of the first place (i.e. a digit of the lowest place) in the telephone number defined as the reference number matches with corresponding one of the other telephone number. When these digits of the first place of both telephone numbers match with each other, another judgment is made next as to whether digits of the second place match between the two telephone numbers.

(4) If there is any digit that does not match, even if it is of only one place, as a result of the check on the first telephone number, another telephone number (the second telephone number) is read from electronic telephone directory 23, and the process goes back to the step (2).

(5) When all digits match between the two telephone numbers in the step (3), telephone number comparator 29 outputs a result indicating that the telephone number displayed in the display unit 22 matches at least in part with the telephone number read out from electronic telephone directory 23.

If one of the telephone number displayed in the display unit 22 and the telephone number registered in electronic telephone directory 23, which has a fewer number of digits, matches with the other one as a result of the comparison, telephone number editor 28 proceeds with a process of editing the telephone number displayed in display unit 22 based on the telephone number registered in electronic telephone directory 23.

Figure 4:
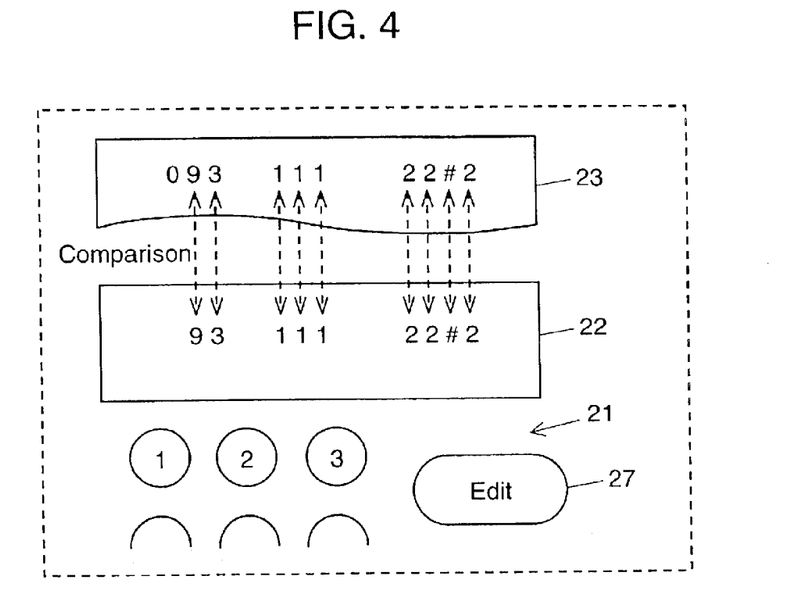
FIG. 4 is a schematic illustration showing another telephone number displayed in the display unit of the telephone apparatus according to the same exemplary embodiment of the invention.

An example shown in FIG. 4 represents a case in which a call-receiving party is in a different area from that of a calling party. This example shows that the caller identification delivery service transmits a telephone number of the calling party without including a first digit of "0" of an area code. Display unit 22 shows a received telephone number "93 111 22#2, for instance, as shown in FIG. 4.

When the user presses edit button 27 on control section 21, the telephone apparatus switches into the editing mode and activates telephone number editor 28 for editing the telephone number displayed in display unit 22 according to a telephone number registered in electronic telephone directory 23. An editing process and a comparing method by telephone number comparator 29 are similar to those described above, that telephone number comparator 29 checks individual digits of the telephone numbers one by one from the last place to the seventh place in a sequential order to determine if they match.

If one of the telephone numbers having a fewer number of digits between the one displayed in display unit 22 and another registered in electronic telephone directory 23 matches with corresponding digits of the other, as a result of the comparison, telephone number editor 28 proceeds with a process of editing the telephone number displayed in display unit 22 based on the telephone number registered in electronic telephone directory 23.

Actually, telephone number editor 28 edits the delivered telephone number stored in caller information storage unit 25 based on the telephone number registered in electronic telephone directory 23, and controller unit 14 reads the edited telephone number from caller information storage unit 25 and displays it in display unit 22. In other words, controller unit 14 replaces the telephone number shown in display unit 22 with the telephone number registered in electronic telephone directory 23.

Figure 5:
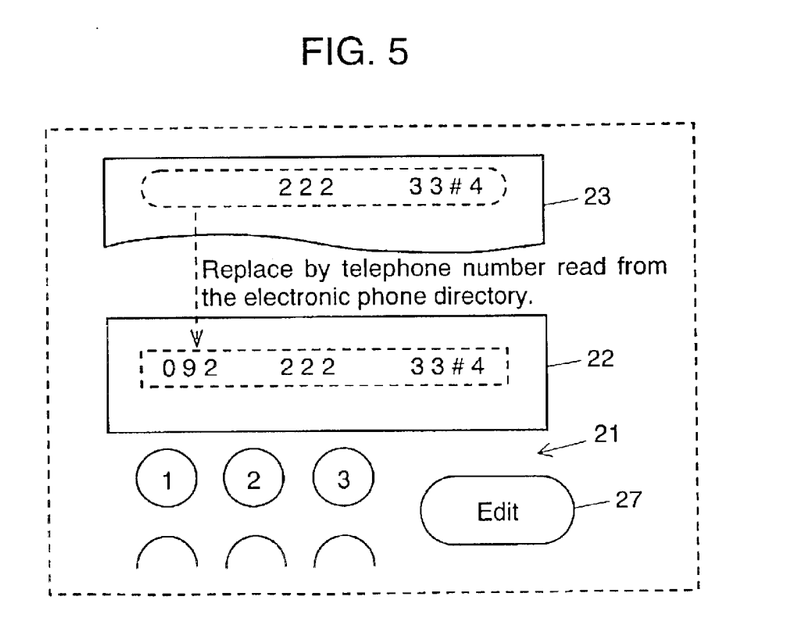
FIG. 5 is a schematic illustration showing still another telephone number displayed in the display unit of the telephone apparatus according to the same exemplary embodiment of the invention.

FIG. 5 shows another example in which the caller identification delivery service transmits an area code of a calling party even though a call-receiving party is in the same area as the calling party. A telephone number of the calling party including the area code transmitted by the caller identification delivery service is stored in caller information storage unit 25, and the number is displayed in display unit 22. Telephone number editor 28 executes a process of editing the telephone number in the like manner as above if there is another one having the same digits from the last place to the seventh place among the telephone number information previously registered in electronic telephone directory 23.

In the example of FIG. 5, since an area code is not included in the telephone number previously registered in electronic telephone directory 23, the area code included in the telephone number displayed in display unit 22 is deleted as a result of the editing. In other words, the area code "092" is deleted in this instance from the telephone number "092 222 33#4" displayed in display unit 22.

Figure 6:
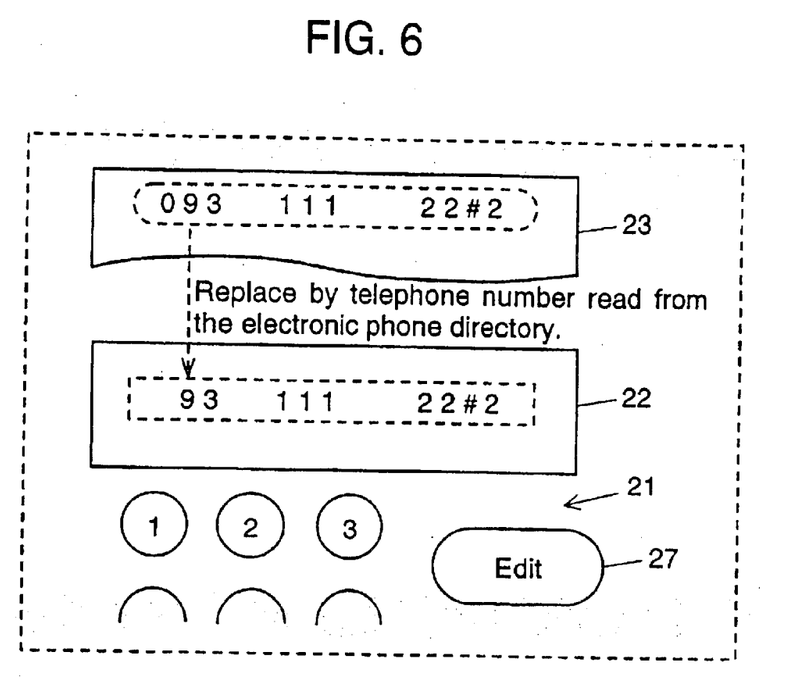
FIG. 6 is a schematic illustration showing yet another telephone number displayed in the display unit of the telephone apparatus according to the same exemplary embodiment of the invention.

An example shown in FIG. 6 represents a case in which a call-receiving party is in a different area from that of a calling party, in which the caller identification delivery service transmits a telephone number of the calling party without including a first digit of "0" of an area code. A telephone number of the calling party including the area code transmitted by the caller identification delivery service is stored in caller information storage unit 25, and the number is displayed in display unit 22. Telephone number editor 28 executes a process of editing the telephone number in the like manner as above if there is another one having same digits from the last place to the seventh place among the telephone number information previously registered in electronic telephone directory 23.

If a telephone number previously registered in electronic telephone directory 23 actually has an area code "093" as the one "093 111 22#2" shown in the example of FIG. 6, the telephone number displayed in display unit 22 is replaced with the actually registered telephone number including the area code "093". In other words, a digit "0" is prefixed in this instance to a portion of the area code "93" of the telephone number "93 111 22#2" displayed in display unit 22 as a result of the editing.

As discussed above, telephone number editor 28 deletes the unwanted area code in the telephone number displayed in display unit 22 in the example shown in FIG. 5, and telephone number editor 28 makes up a lacking portion of the area code in the telephone number displayed in display unit 22, in the example shown in FIG. 6.

When the user presses a call back button, telephone number information edited by telephone number editor 28 is transferred to dial signal transmitter 26, which in turn transmits a dial signal corresponding to that number to the telephone line.

What have been discussed above are examples wherein the telephone apparatus displays edited telephone number in display unit 22 immediately after the editing process, to show it to the user. However, this invention can be embodied in another way, wherein the telephone apparatus displays in display unit 22 a telephone number delivered with an incoming call rather than an edited telephone number, and it displays the edited telephone number only when the user is going to return the call. This is because there is not practically any problem even if display unit 22 does not show the edited telephone number.

According to the present invention as discussed above, telephone number editor 28 operates when the user presses the edit button 27 on control section 21, as he/she makes a callback to the telephone number delivered with the incoming call and displayed in display unit 22. Since telephone number editor 28 in operation edits properly the area code portion of the telephone number shown in display unit 22 based on the telephone number previously registered in electronic telephone directory 23, it can save time of the user to input digits one by one for addition and/or deletion of the area code, as has been with the conventional telephone apparatus. However, if a telephone number delivered with an incoming call and displayed in display unit 22 is not one of those already registered in electronic telephone directory 23, the user is still required to input digits one by one to edit and/or delete the area code of the unregistered telephone number, in the same manner as in the case of the conventional telephone apparatus.

In the foregoing embodiment, telephone number editor 28 is illustrated as such that it operates only when the edit button 27 on control section 21 is pressed. However, the telephone number editor 28 may be so designed that it operates automatically in advance by operation of control section 21. If this is the case, the telephone number delivered with the incoming call is displayed in display unit 22 after telephone number editor 28 edits an area code portion of it beforehand.

Furthermore, although the foregoing embodiment is illustrated as such that telephone number editor 28 edits the telephone number delivered with the incoming call when this telephone number matches with another telephone number registered in electronic telephone directory 23 as a result of comparison, this process may be so altered that the telephone apparatus uses the telephone number registered in electronic telephone directory 23 for dialing when the numbers match with each other. This can ensure the telephone apparatus to dial correctly without needing an editing process.

As described, the telephone number based on the telephone numbers registered in the electronic telephone directory means one of the telephone number previously registered in electronic telephone directory 23 and the telephone number edited by telephone number editor 28.

According to the present invention as described above, the telephone apparatus is so constructed that the display unit displays a telephone number based on one of the telephone numbers registered in the electronic telephone directory if the telephone number matches at least in part with the received number as a result of comparison by the telephone number comparator. As a result, the telephone apparatus has an advantage that it can display a correct telephone number automatically if the telephone number delivered with the incoming call is same as one of the telephone numbers registered in the electronic telephone directory.

In addition, the telephone apparatus has an advantage that it automatically edits an area code of the telephone number displayed in the display unit when the user presses only the edit button before making a callback to the telephone number of the incoming call, thereby ensuring the correct telephone number for the user to complete the callback.

Moreover, the telephone apparatus allows the user to edit an area code of telephone number easily, since it can delete unnecessary area code and add an area code if lacking in the editing process.

What has been described in the above embodiment is an example, in which this invention is adapted to a stationary type telephone apparatus. However, the invention may be embodied in other forms such as a portable cellular phone wherein a caller's telephone number is input automatically upon reception of an incoming call.

What is claimed is:

1. A telephone apparatus comprising:
   a) a caller information receiving unit for receiving caller information delivered from caller identification delivery service;
   b) a caller information storage unit for storing said received caller information;
   c) a dial signal transmitter for transmitting a dial signal;
   d) an electronic telephone directory for registering a telephone number;
   e) a telephone number comparator for comparing a telephone number included in said caller information with said telephone number registered in said electronic telephone directory, and
   f) a display unit for displaying said telephone number registered in said electronic telephone directory when predetermined digits beginning from a last digit of said telephone number included in said caller information match each corresponding digit of said telephone number registered in said electronic telephone directory as a result of comparison by said telephone number comparator.

2. A telephone apparatus comprising:
   a) a caller information receiving unit for receiving caller information delivered from caller identification delivery service;
   b) a caller information storage unit for storing the received caller information;
   c) a display unit for displaying the received caller information;
   d) a dial signal transmitter for transmitting a dial signal;
   e) an electronic telephone directory for registering a telephone number and the like; and
   f) a telephone number comparator for comparing a telephone number included in the caller information stored in said caller information storage unit with the telephone number registered in said electronic telephone directory,
   wherein said dial signal transmitter dials a telephone number based on the telephone number registered in said electronic telephone directory when a portion of said telephone number included in said caller information and said telephone number registered in said electronic telephone directory matches as a result of comparison by said telephone number comparator.

3. The telephone apparatus set forth in claim 1 further comprising a telephone number editor for editing the telephone number stored in said caller information storage unit based on the telephone number registered in said electronic telephone directory.

4. The telephone apparatus set forth in claim 2 further comprising a telephone number editor for editing the telephone number stored in said caller information storage unit based on the telephone number registered in said electronic telephone directory.

5. The telephone apparatus set forth in one of claim 1 and claim 2, wherein said telephone number based on the telephone number registered in said electronic telephone directory is at least one of the telephone number registered in said electronic telephone directory and the telephone number edited by said telephone number editor.

6. The telephone apparatus set forth in one of claim 1 and claim 2, wherein said telephone number comparator checks individual digits of the telephone number stored in said caller information storage unit and the telephone number registered in said electronic telephone directory one by one from the last place to a predetermined place in a sequential order, to determine whether the telephone numbers match.

7. The telephone apparatus set forth in claim 6, wherein said predetermined place of the telephone numbers is seventh place.

* * * * *